Aug. 9, 1960  E. A. LEVIN  2,948,161
INCREMENTAL BIDIRECTIONAL DRIVE MECHANISM
Filed May 18, 1959  2 Sheets-Sheet 1
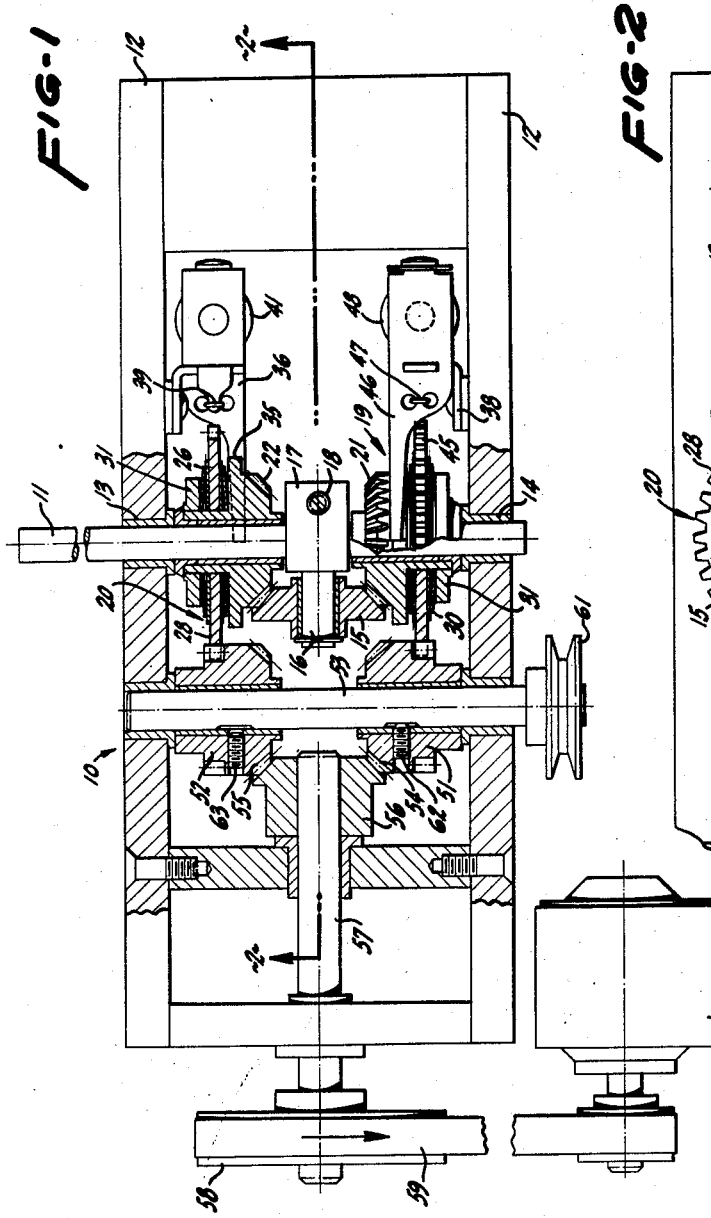
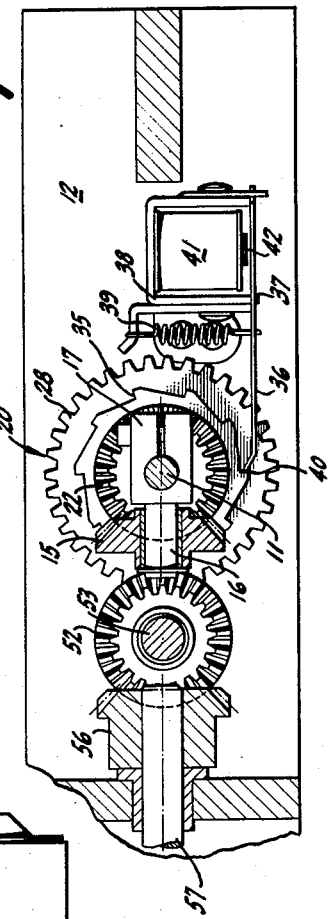
INVENTOR.
EUGENE A. LEVIN
BY
Mellin and Hanscom
ATTORNEYS

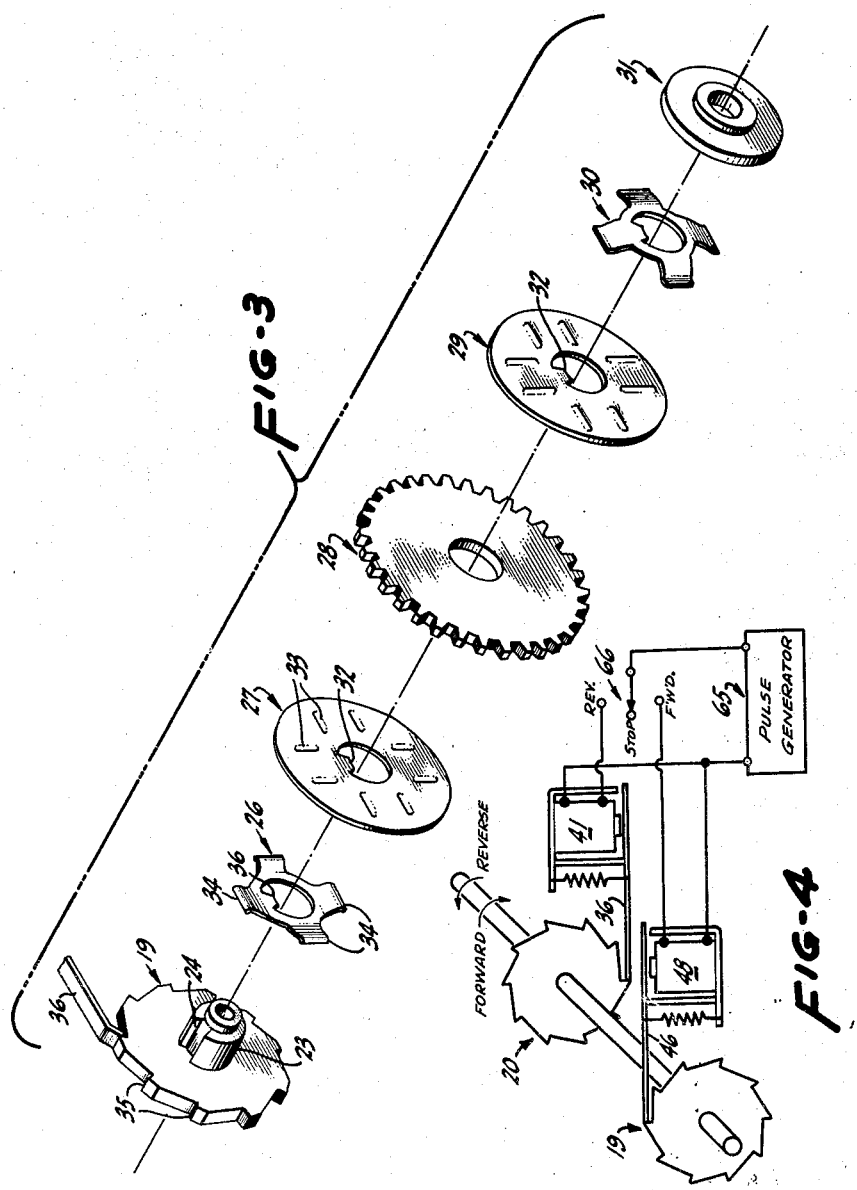

United States Patent Office 2,948,161
Patented Aug. 9, 1960

2,948,161

INCREMENTAL BIDIRECTIONAL DRIVE MECHANISM

Eugene A. Levin, Seattle, Wash., assignor to Tally Register Corporation, Seattle, Wash., a corporation of Washington Filed May 18, 1959, Ser. No. 813,716

9 Claims. (Cl. 74—379)

This invention relates to drive mechanisms and more particularly to a drive mechanism wherein a continuously unidirectional rotating input shaft is used to incrementally rotate an output shaft in either direction of rotation thereof as desired.

Although its use is not so limited, the drive mechanism of the present invention finds particular use in perforated tape handling machines wherein it is desired to move the tape forwardly or backwardly as desired through increments corresponding to the distance between sets of perforations. In general, it is desirable that the tape be stopped after each forward or backward step so that the perforations can be read or so that perforations may be formed when the tape is at rest. Also, it is desirable that the linear rate of movement of the tape between adjacent steps be asynchronous in regard to the rate at which such steps are taken. In other words, it is desirable that the time required for the tape to be moved from one set of perforations to an adjacent set of perforations be independent of the rate at which such movements are made. Furthermore, it is desirable that the tapes be instantly reversible as to direction of movement thereof.

The primary object of the invention is to provide a drive unit having an output shaft which is rotatable in either direction as desired at a constant rate of rotation through predetermined increments, in which the output shaft comes to a stop after each increment of rotation and in which the direction of rotation of the output shaft can be instantly reversed when desired.

Other objects and advantages will become apparent in the course of the following detailed description.

In the drawings forming a part of this application, and in which like parts are designated by like reference numerals throughout the same, Fig. 1 is a plan view, partly in section, of a drive mechanism constructed in accordance with the invention.

Fig. 2 is a sectional view, taken on line 2—2 of Fig. 1.

Fig. 3 is an exploded view of an escapement wheel drive assembly.

Fig. 4 is a circuit diagram for operation of the drive mechanism of Fig. 1.

Referring now to the drawings, the drive mechanism 10 comprises an output shaft 11 journaled in frame 12 by bearings 13 and 14. A spider bevel gear 15 is mounted for free rotation on spider shaft 16 which is fixed to collar 17 clamped to the output shaft 11 by screw 18. Escapement wheel members 19 and 20, mounted on output shaft 11 on either side of spider shaft 16, have bevel gears 21 and 22 formed integrally respectively therewith in mesh with the spider bevel gear 15. The escapement wheel members 19 and 20 are not pinned or keyed to the output shaft 11 in any manner, but are free to rotate thereon.

As seen in the exploded view, Fig. 3, the escapement wheel member 19 has a hub 23 integral therewith provided with a key groove 24 formed longitudinally thereon. Disposed on the hub, in order, are a spring washer 26, a fiber washer 27, a drive gear 28, a fiber washer 29, a spring washer 30 and a locking cap 31. Keys 32 on the spring washers 26 and 30 and the fiber washers 27 and 29 are received within groove 24 on hub 23 to prevent relative rotation therebetween. Drive gear 28 is not keyed to hub 23 but is free to rotate thereon.

When assembled on the hub 23, the fiber washers 27 and 29, acting as friction discs, are squeezed against the drive gear 28 by the spring washers 26 and 30. The eight raised ribs 33 on the fiber friction discs retain the four arms 34 of the spring washers so that torque delivered to the friction discs by the drive gear is transmitted to the spring washers and to the escapement wheel member. By the above arrangement an impositive friction drive is provided between the drive gear 28 and the escapement wheel 19. If the escapement wheel is free to rotate, the frictional engagement between the friction discs 27 and 29 and drive gear 28 will cause the escapement wheel to rotate in unison with the drive gear. However, if the escapement wheel is held against rotation, the impositive connection between the friction discs and the drive gear will allow the drive gear to continue its rotation on hub 23 without imparting rotative movement to the escapement wheel.

The escapement wheel 20 is provided with ten equally spaced escapement or ratchet teeth 35 around the periphery thereof. A pallet lever 36, pivoted at 37 to bracket 38 secured to frame 12, is biased by spring 39 so that the end 40 of the pallet lever engages one of the escapement teeth 35 to normally restrain rotation of the escapement wheel by drive gear 28. Electromagnet 41, mounted on bracket 38, has its pole piece 42 positioned to attract pallet lever 36 upon energization of the electromagnet to cause the pallet lever to pivot out of holding engagement with the escapement teeth of the escapement wheel 20. Such release will allow the escapement wheel to be rotated by the drive gear 28. De-energization of the magnet 41 will allow the pallet lever 36 to pivot back into stopping engagement with the escapement wheel.

Escapement wheel 19 is similarly constructed and is provided with a drive gear 45 thereon. Pallet lever 46 is operable by spring 47 and electromagnet 48 to pivot into and out of engagement with the ratchet teeth on the escapement wheel 19, as described above.

The drive gears 45 and 28 are in mesh with gear clusters 51 and 52 mounted on shaft 53 journaled in frame 12. Gear clusters 51 and 52 have bevel gears 54 and 55, respectively, integral therewith in mesh with drive gear 56 fixed on input shaft 57 journaled in frame 12. The pulley 58 fixed on input shaft 57 is driven at a constant unidirectional rate by lug-belt 59 which is driven by motor 60.

As is seen in Fig. 1, the drive gear 56, driven by motor 60 in the direction indicated, rotates the gear clusters 51 and 52 in opposite directions on shaft 53 and at the same rotational speeds. In turn, the drive gears 28 and 45 are rotated at equal speeds in opposite directions coaxially to the output shaft 11.

Shaft 53 projects outwardly through frame 12 and has pulley 61 secured thereto in the event that a power take-off may be desired. Shaft 53 and pulley 61 may be rotated at a speed equal to shaft 57 by fixing either gear cluster 51 or 52 thereto by setscrew 62 or 63, depending on the direction of rotation desired in shaft 53. In addition, the input drive to the drive unit 10 may come from pulley 61 instead of pulley 58, if desired. If pulley 61 is used for the input drive, then either gear cluster 51 or 52 must be fixed to shaft 53, depending upon the direction of rotation of pulley 61. As is apparent, since gear clusters 51 and 52 rotate in opposite directions on shaft 53, only one of these gear clusters can be fixed to this shaft.

An electrical circuit for the operation of the drive mechanism 10 is illustrated in Fig. 4. The output of a pulse generator 65 may be connected to either electromagnet 41 or 48 by means of switch 66. Switch 69 has three positions, as illustrated in Fig. 4, "Stop," "Fwd." and "Rev." When switch 69 is in the "Fwd." position, electrical pulses will be applied from the pulse generator 68 to the electromagnet 48. When switch 69 is in the "Rev." position, pulses will be applied to electromagnet 41, and when switch 69 is in the "Stop" position, no pulses will be applied to either electromagnet.

The details of the pulse generator 65 have not been illustrated, as they form no part of the invention. Any pulse generator may be used, as long as it will produce electrical pulses of sufficient voltage and of sufficient duration to energize the magnets 41 and 48 to attract the pallet levers associated therewith.

In one operating model of the invention, the electromagnets 41 and 48 require a 50-volt pulse of 4–5 millisecond duration for energization, and the pallet levers will move out of engagement with the escapement teeth approximately 2 milliseconds after the leading edge of an energizing pulse has been applied by the pulse generator to an electromagnet. The motor 60 rotates the drive gears 28 and 45 at 7.2 revolutions per second, so that when one of the pallet levers is out of engagement with the escapement wheel associated therewith, the escapement wheel will rotate through a one tooth advance in about 14 milliseconds. Thus, a total time of about 16 milliseconds is required from the leading edge of the energizing pulse until the escapement wheel rotates through a single tooth advance. With an energizing pulse of approximately six milliseconds duration, generated by the pulse generator 65, the pallet levers will have been moved back into stopping engagement with the escapement wheel and will arrest movement thereof at the end of the one tooth advance. The escapement wheel will remain at rest until another pulse is applied to the electromagnet.

From the above, it is apparent that for the escapement wheel to come to rest after a one tooth advance thereof, it is necessary that the length of time between the leading edges of consecutive pulses be greater than 16 milliseconds. For example, a pulse generator operating at 60 cycles per second may be used, since the time between cycles is 16.7 milliseconds. Obviously any pulse generator having a repetition rate less than 60 cycles per second may be used, if desired. Furthermore, the pulse generator can have a random repetition rate, as long as the time between the leading edges of consecutive pulses is greater than the 16 milliseconds.

It is to be realized, of course, that the above figures are illustrative of operation only, and are not to be considered as the only condition of operation possible. The feature of criticality is that for a selected speed of rotation of the drive gears 28 and 45, the time length between the leading edges of consecutive pulses applied to the magnets 41 and 48 must be greater than the time required for an escapement wheel to rotate through a one tooth advance after the energization of a magnet to release the escapement wheel for rotation.

In the operation of the drive mechanism, the motor 60 will rotate the drive gears 28 and 45 at equal rates of speed but in opposite directions. Both escapement wheels 19 and 20 are restrained from rotation by engagement of the pallet levers associated therewith.

If it is desired to rotate the drive shaft 11 in a forward direction, switch 66 is switched to the "Fwd." position, applying a pulse to electromagnet 48. Pallet lever 46 is moved out of engagement with escapement wheel 19, allowing this wheel to be rotated by the frictional engagement of friction discs 27 and 29 with drive gear 45. The rotation of the bevel gear 21 thereon causes the spider bevel gear 15 to rotate about spider shaft 16. Since bevel gear 22 on escapement wheel 20 is locked against rotation by pallet lever 36, the spider shaft 16 rotates about the axis of the output shaft 11. But, since the spider shaft is clamped to the output shaft, the output shaft will itself rotate, in a forward direction indicated in Fig. 4.

As the escapement wheel 19 rotates through a one tooth advance, the next escapement tooth comes into engagement with the pallet lever 46 and the escapement wheel 19 and output shaft 11 come to rest. The parts will now remain in this position until the next pulse is applied to electromagnet 48, at which time the preceding operation will re-occur. As is obvious, this operation will be the same regardless of the length of time between the stopping of the escapement wheel and the application of the next pulse, and thus the rotation of the output shaft is asynchronous with the pulse repetition rate. The step by step advance of the output shaft will continue as long as the switch 66 is in the "Fwd." position and pulses are applied to the magnet 48.

If at any time it is desired to reverse the rotation of the output shaft, the switch 66 is merely moved to the "Rev." position. Pulses will now be applied to magnet 41 to release escapement wheel 20 for incremental advance. As described above, the incremental advance rotates spider bevel gear 15 about spider shaft 16, and causes the spider shaft to rotate the output shaft in a reverse direction.

Since the output shaft and the escapement wheels come to a stop after every incremental advance, it is obvious that the next rotation of the output shaft can be in either direction. That is, the first of two consecutive pulses can be used to rotate the output shaft in one direction, and the second pulse can be used to reverse the rotation of the output shaft. Such a feature obviously is advantageous in that it eliminates any need to slow down the operation before a direction reversal can be obtained.

It is to be understood that the form of the invention herewith shown and described is to be taken as a preferred embodiment of the same, and that various changes may be made in the shape, size, and arrangement of parts without departing from the spirit of the invention or the scope of the attached claims.

Having thus described my invention, what I claim and desire to secure by Letters Patent is:

1. A bi-directional drive mechanism comprising first and second escapement wheels each having a plurality of escapement teeth thereon, drive means for impositively and separately rotating said escapement wheels, first and second pallet levers biased into engagement with the escapement teeth of said first and second escapement wheels, respectively, to restrain rotation of said wheels by said drive means, means to selectively move one of said pallet levers out of engagement with the escapement teeth engaged thereby, an output shaft, and means to rotate said shaft in one direction upon rotation of said first escapement wheel by said drive means and to rotate said shaft in an opposite direction upon rotation of said second escapement wheel by said drive means.

2. A bi-directional drive mechanism comprising first and second escapement wheels each having a plurality of escapement teeth thereon, drive means for impositively, separately and unidirectionally rotating said escapement wheels, first and second pallet levers biased into engagement with the escapement teeth of said first and second escapement wheels, respectively, to restrain rotation of said wheels by said drive means, pulse operated electromagnetic means operatively associated with said first and second pallet levers to move a selected one of said levers out of engagement with the escapement teeth engaged therewith upon energization of said electromagnetic means, an output shaft, and means to rotate said shaft in one direction upon rotation of said first escapement wheel by said drive means and to rotate said shaft in an opposite direction upon rotation of said second escapement wheel by said drive means.

3. A drive mechanism as set forth in claim 2 wherein said drive means comprises first and second friction drive members coaxially mounted adjacent to and in frictional engagement with said first and second escapement wheels, respectively, first and second drive gears in meshing engagement with said first and second friction drive members, respectively, a third drive gear in meshing engagement with both of said first and second drive gears, a motor, and means drivingly connecting said motor to one of said drive gears.

4. An incremental bi-directional drive mechanism comprising first and second escapement wheels each having a plurality of escapement teeth thereon, drive means for impositively, separately and unidirectionally rotating said escapement wheels, first and second pallet levers biased into engagement with the escapement teeth of said first and second escapement wheels, respectively, to restrain rotation of said wheels by said drive means, first and second pulse operated electromagnetic means operatively associated with said first and second pallet levers, respectively, to move a selected one of said levers out of engagement with the escapement teeth engaged therewith upon energization of a selected one of said electromagnetic means, an output shaft, means to rotate said shaft in one direction upon rotation of said first escapement wheel by said drive means and to rotate said shaft in an opposite direction upon rotation of said second escapement wheel by said drive means, a pulse generator, and circuit means for electrically connecting said pulse generator to a selected one of said electromagnetic means.

5. An incremental bi-directional drive mechanism comprising first and second escapement wheels each having a plurality of escapement teeth thereon, drive means for impositively, separately and unidirectionally rotating said escapement wheels, first and second pallet levers biased into engagement with the escapement teeth of said first and second escapement wheels, respectively, to restrain rotation of said wheels by said drive means, first and second pulse operated electromagnetic means operatively associated with said first and second pallet levers, respectively, to move a selected one of said levers out of engagement with the escapement teeth engaged therewith upon energization of a selected one of said electromagnetic means, an output shaft, means to rotate said shaft in one direction upon rotation of said first escapement wheel by said drive means and to rotate said shaft in an opposite direction upon rotation of said second escapement wheel by said drive means, a pulse generator, circuit means for electrically connecting said pulse generator to a selected one of said electromagnetic means, said pulse generator having a pulse repetition rate such that the length of time between the leading edges of consecutive pulses is at least as long as the time required for a one tooth advance of one of said escapement wheels when the latter is free to be rotated by said drive means.

6. A bi-directional drive mechanism comprising an output shaft, first and second gears mounted on said output shaft for free rotation thereon, a spider shaft fixed to and extending radially from said output shaft intermediate said first and second gears, a third gear mounted for free rotation on said spider shaft and in meshing engagement with both said first and second gears, impositive drive means for rotating each of said first and second gears at equal speeds of rotation but in opposite directions, an escapement tooth on each of said first and second gears, first and second pallet levers engageable with said escapement teeth to restrain rotation of said first and second gears when engaged with said teeth and to permit rotation of said gears when out of engagement with said teeth, said levers being resiliently biased into engagement with said teeth, and means to selectively move one of said pallet levers out of engagement with the ratchet tooth associated therewith.

7. A bi-directional drive mechanism comprising an output shaft, first and second gears mounted on said output shaft for free rotation thereon, a spider shaft fixed to and extending radially from said output shaft intermediate said first and second gears, a third gear mounted for free rotation on said spider shaft and in meshing engagement with both said first and second gears, impositive drive means for rotating each of said first and second bevel gears at equal speeds of rotation but in opposite directions, an escapement ratchet tooth on each of said first and second gears, first and second pallet levers engageable with said escapement teeth to restrain rotation of said first and second gears when engaged with said teeth to permit rotation of said gears when out of engagement with said teeth, said levers being resiliently biased into engagement with said teeth, and first and second pulse operated electromagnetic means operatively associated with said first and second pallet levers, respectively, to move said levers out of engagement with said teeth upon energization of said electromagnetic means.

8. An incremental bi-directional drive mechanism comprising an output shaft, first and second bevel gears mounted on said output shaft for free rotation thereon, a spider shaft fixed to and extending radially from said output shaft intermediate said first and second bevel gears, a third bevel gear mounted for free rotation on said spider shaft and in meshing engagement with said first and second bevel gears, impositive drive means for rotating each of said first and second bevel gears at equal speeds of rotation but in opposite directions, a plurality of escapement teeth on said first and second bevel gears, first and second pallet levers engageable with said escapement teeth of said first and second bevel gears, respectively, to restrain rotation of said bevel gears when engaged with said teeth and to permit rotation of said bevel gears when out of engagement with said teeth, said levers being normally resiliently biased into engagement with said teeth, first and second pulse operated electromagnetic means operatively associated with said first and second pallet levers, respectively, to move said levers out of engagement with said teeth upon energization of said electromagnetic means, a pulse generator, circuit means for electrically connecting said pulse generator to a desired one of said electromagnetic means, said pulse generator having a pulse repetition rate such that the length of time between the leading edges of consecutive pulses is at least as long as the time required for a one tooth advance of one of said first and second bevel gears when the latter is free to rotate.

9. A drive mechanism as set forth in claim 8 wherein said impositive drive means comprises first and second friction drive members coaxially mounted adjacent to and in frictional engagement with said first and second bevel gears, respectively, first and second drive gears in meshing engagement with said first and second friction drive members, respectively, a third drive gear in meshing engagement with both of said first and second drive gears, a motor, and means drivingly connecting said motor to one of said drive gears.

References Cited in the file of this patent

UNITED STATES PATENTS

| | | |
|---|---|---|
| 2,078,161 | Rietsch | Apr. 20, 1937 |
| 2,125,769 | Crocker | Aug. 2, 1938 |
| 2,810,302 | James et al. | Oct. 22, 1957 |